(12) United States Patent
Liu et al.

(10) Patent No.: US 11,093,698 B2
(45) Date of Patent: Aug. 17, 2021

(54) METHOD AND APPARATUS AND COMPUTER DEVICE FOR AUTOMATIC SEMANTIC ANNOTATION FOR AN IMAGE

(71) Applicant: BAIDU ONLINE NETWORK TECHNOLOGY (BEIJING) CO., LTD., Beijing (CN)

(72) Inventors: Xiao Liu, Beijing (CN); Jiang Wang, Beijing (CN); Shilei Wen, Beijing (CN); Errui Ding, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 237 days.

(21) Appl. No.: 15/270,088

(22) Filed: Sep. 20, 2016

(65) Prior Publication Data

US 2017/0329755 A1    Nov. 16, 2017

(30) Foreign Application Priority Data

May 13, 2016    (CN) .......................... 201610320009.X (51) Int. Cl.
| | | |
|---|---|---|
| *G06F 40/169* | (2020.01) | |
| *G06K 9/00* | (2006.01) | |
| *G06K 9/62* | (2006.01) | |

(52) U.S. Cl.
CPC ....... *G06F 40/169* (2020.01); *G06K 9/00664* (2013.01); *G06K 9/6268* (2013.01)

(58) Field of Classification Search
CPC .......... G06F 17/24; G06F 17/25; G06T 11/60; A63F 2300/5553; A63F 2300/6623
(Continued)

(56) References Cited

U.S. PATENT DOCUMENTS 9,280,562 B1*  3/2016 Zhang ................. G06F 16/5838
2015/0294191 A1* 10/2015 Zhang ................. G06N 99/005
                                                382/160
(Continued)

FOREIGN PATENT DOCUMENTS

| CN | 103336969 A | 10/2013 |
|---|---|---|
| CN | 104077352 A | 10/2014 |

(Continued)

OTHER PUBLICATIONS

The First Search Report for CN201610320009X dated Dec. 28, 2016, 1 page.

*Primary Examiner* — Kavita Stanley
*Assistant Examiner* — Jenq-Kang Chu
(74) *Attorney, Agent, or Firm* — Nixon Peabody LLP (57) ABSTRACT

According to the embodiments of the present invention, there is provided a method for training an image semantics annotation apparatus, comprising: a. providing a plurality of training images, wherein semantics and visual attribution description of respective training images are known; b. inputting at least part of the training images to a locator of the image semantic annotation apparatus; c. determining, by the locator, at least one local area of each input training image, and inputting the determined respective local areas into an attribute predictor of the image semantic annotation apparatus; d. obtaining a visual attribute prediction result of each input local area from the attribute predictor; e. training the locator and the attribute predictor according to the obtained visual attribute prediction result of each local area and a known visual attribute description of the corresponding training image.

12 Claims, 5 Drawing Sheets

(58) Field of Classification Search
USPC .................................. 715/201, 202, 230, 255
See application file for complete search history.

(56) References Cited

U.S. PATENT DOCUMENTS

| | | | | |
|---|---|---|---|---|
| 2016/0307072 | A1* | 10/2016 | Zhou ......................... | G06K 9/66 |
| 2016/0379091 | A1* | 12/2016 | Lin .................... | G06K 9/00724 |
| | | | | 382/156 |
| 2017/0206465 | A1* | 7/2017 | Jin ........................... | G06N 3/08 |

FOREIGN PATENT DOCUMENTS

| | | |
|---|---|---|
| CN | 104809187 A | 7/2015 |
| CN | 105005794 A | 10/2015 |

\* cited by examiner

METHOD AND APPARATUS AND COMPUTER DEVICE FOR AUTOMATIC SEMANTIC ANNOTATION FOR AN IMAGE

CROSS REFERENCE OF RELATED APPLICATIONS

The present application claims priority to the Chinese patent application No.: 201610320009.X filed on May 13, 2016, which is incorporated herein in its entirety by reference.

FIELD OF THE INVENTION

The present invention relates to the field of image processing, and more specifically to a method and apparatus for automatic semantic annotation for an image, and a computer device comprising the apparatus.

BACKGROUND OF THE INVENTION

In the past decades, with expeditious development and population of the computer network technologies as well as dramatic reduction of data storage costs, use of multimedia databases will become more and more prevalent. Multimedia information presented in forms of images, music, and videos have exerted an increasingly important role in businesses and entertainments. It is a very important issue how to effectively manage and organize so mass data and search out information desired by a user therefrom. There has been a long history for studying multimedia, particularly image data browsing, searching and indexing technologies. Now tasks regarding image database and visual information search have become a most active part in the study field.

To perform one image searching, a search engine generally requires a user to provide a description of the intended search. Such description may be a set of key word queries or a picture of case image. The former is referred to as a semantic (annotation)-based image search, while the latter is referred to as a content-based image search.

In order to implement a semantic-based image search, it is needed to perform semantic annotation to an image in the database. Automatic semantic annotation for an image refers to a procedure of making a computer to understand the contents in the image using a computer visual technology so as to automatically annotate textual semantics for the image. In other words, the automatic semantic annotation for an image refers to a procedure of making a computer to perform accurate description and understanding to the semantics of the image, which is essentially establishing a connection between the image and the textual semantics.

The existing method for image semantics annotation mainly has the following two implementation manners:

The first implementation manner is that the computer extracts a feature on an entire image and performs classification identification to the image, i.e., using the whole picture as an input to a classifier. However, images in many similar categories have a high overall similarity. For example, images of different models of sedans may only have several fine differences, while features extracted from the entire image are always insufficient to accurately distinguish such fine-granular image categories, which results in a poor semantic annotation effect.

The second implementation manner is manually determining a salient region of the image. The salient region may embody differences between different fine-grained images, e.g., model logos of different brands, and eyes of different species of cats. Afterwards, features are extracted for these salient areas for fine-grained image semantics annotation. However, because the number of images in the image database is huge, extremely considerable human resources will be consumed apparently to manually determine a salient area for each image. This limits a feasibility for such solution.

Automatic image semantics annotation can only be developed further when the problems above in the prior art are solved.

SUMMARY OF THE INVENTION

An objective of the present invention provides a novel method and apparatus for image semantics annotation so as to solve the problems in the prior art.

Specifically, according to an embodiment of a first embodiment of the present invention, there is provided a method of training an image semantic annotation apparatus, comprising: a. providing a plurality of training images, wherein semantics and visual attribution description of respective training images are known; b. inputting at least part of the training images to a locator of the image semantic annotation apparatus; c. determining, by the locator, at least one local area of each input training image, and inputting the determined respective local areas into an attribute predictor of the image semantic annotation apparatus; d. obtaining a visual attribute prediction result of each input local area from the attribute predictor; e. training the locator and the attribute predictor according to the obtained visual attribute prediction result of each local area and a known visual attribute description of the corresponding training image.

Specifically, semantics of the plurality of training images is not completely identical fine-grained semantics corresponding to a same coarse-grained semantics.

Specifically, the coarse-grained semantics corresponds to a coarse-grained classification object; the different fine-grained semantics corresponds to different fine-grained classification objects belonging to the coarse-grained classification object.

Specifically, each of the fine-grained classification objects includes at least one feature part, the visual attribute descriptions are divided into different groups based on their corresponding feature parts, the method comprising: for each of the feature parts, repeating steps a to d till convergence.

Specifically, the step a comprises: digging a page including images to obtain a plurality of training images, the semantic tags and the visual attribute descriptions of respective training images.

Specifically, the step e comprises: for each of the local areas, calculating a loss function according to a visual attribute prediction result of the local area and a visual attribute description of the corresponding training image, for training the locator and the attribute predictor.

Specifically, the step e further comprises: calculating gradients of the locator and the attribute predictor according to a reverse propagation algorithm to determine or update parameters of the locator and the attribute predictor.

Specifically, the method further comprises: f. selecting at least part of training images from the plurality of training images; g. processing each of the selected training images by the trained locator so as to locate, on the training image, at least one feature part of the fine-grained classification object corresponding to the training image; h. inputting the feature part located for each of the selected training images and the known semantic tag of the trained image into a classifier of the image semantics annotation apparatus to train the classifier.

Specifically, the step h comprises: calculating a convolution feature of each located feature part for each of the selected training images; generating a vector for the training image according to the calculated convolution feature of each feature part; and training the classifier by a support vector machine according to the generated vector.

Specifically, the step h further comprises: for each selected training image, calculating an overall convolution feature of the training image; the step of generating a vector for the image further comprises: generating the vector for the training image according to the calculated overall convolution feature of the image and the calculated convolution feature of each feature part of the image.

According to an embodiment in a second aspect of the present invention, there is provided an image semantics annotation method, comprising: I. training the image semantics annotation apparatus according to the aforementioned method; II. performing semantics annotation to the trained image semantics annotation apparatus.

Specifically, the step II comprises: inputting the to-be-annotated image into a locator of the trained image semantics annotation apparatus, such that the locator locates at least one feature part of a fine-grained object corresponding to the to-be-annotated object; inputting the located at least one feature part of the fine-grained object corresponding to the to-be-annotated image into a classifier of the trained semantics annotation apparatus, such that the classifier generates semantics of the to-be-annotated image according to the at least one feature part.

Specifically, the semantics generated by the classifier for the to-be-annotated image includes fine-grained semantics.

According to an embodiment of a third aspect of the present invention, there is provided an computer device that can train itself, comprising: a processor and a memory, the processor being configured to: provide a plurality of training images, wherein semantics and visual attribution description of respective training images are known; determine, using at least part of the plurality of training images as input, at least one local area of each input training image; obtain, with the each local area determined, a visual attribute prediction result of each input local area; and train the computer device according to the obtained visual attribute prediction result of each local area and a known visual attribute description of the corresponding training image.

Specifically, semantics of the plurality of training images is not completely identical fine-grained semantics corresponding to a same course-grained semantics.

Specifically, the coarse-grained semantics corresponds to a coarse-grained classification object; the different fine-grained semantics corresponds to different fine-grained classification objects belonging to the coarse-grained classification object.

Specifically, each of the fine-grained classification objects includes at least one feature part, the visual attribute descriptions are divided into different groups based on their corresponding feature parts; the processor is also configured to: for each of the feature parts, perform the corresponding operations till convergence.

Specifically, the processor is further configured to: dig a page including images to obtain a plurality of training images, the semantic tags and the visual attribute descriptions of respective training images.

Specifically, the processor is further configured to: for each of the local areas, calculate a loss function according to a visual attribute prediction result of the local area and a visual attribute description of the corresponding training image, for training the locator and the attribute predictor.

Specifically, the processor is further configured to: calculate gradients according to a reverse propagation algorithm to determine or update parameters.

Specifically, the processor is further configured to: select at least part of training images from the plurality of training images; after the training above, process each of the training images selected so as to locate, on the training image, at least one feature part of the fine-grained classification object corresponding to the training image; train the computer device per se with each feature part located by the processor on each selected training image and the known semantic tag of each selected training image as inputs.

Specifically, the processor is configured to: calculate a convolution feature of each located feature part for each of the selected training images; generate a vector for the training image according to the calculated convolution feature of each feature part; and train the computer device by a support vector machine according to the generated vector.

Specifically, the processor is further configured to: calculate an overall convolution feature of each training image selected; for each training image selected, generate the vector for the training image according to the calculated convolution feature of respective feature parts of the training image as calculated and the overall convolution feature of the training image calculated.

Specifically, the processor is further configured to, after the training above, locate, on a to-be-annotated image, at least one feature part of the fine-grained object corresponding to the to-be-annotated image; and generate semantics of the to-be-annotated image with the at least one feature part located on the to-be-annotated image as input.

Specifically, the semantics of the to-be-annotated image, as generated by the processor, includes fine-grained semantics.

Compared with the prior art, the method, apparatus or computer device according to the embodiments of the present invention have the following advantages:

1. The trained locator can locate salient areas in an image more accurately. Such salient areas always embody differences between different fine-grained images. For example, for images of birds, different species of birds will have differences in details in feather color and beak colors, while such differences are just embodied in the salient areas. Accurately locating these salient areas enable the classifier to more accurately "read" the differences therebetween so as to finely classify and annotate the images. This cannot be done by the existing manner of extracting full-map information to annotate.

2. Compared with the training manner that needs manual intervention to partition salient areas and provide image semantics, in the embodiment of the present invention, the locator, training images needed for training the attribute predictor, semantics of the training images, and attribute descriptions specific to the embodiments of the present invention may be dug out by a computer from pages on the Internet, which saves considerable manual operations.

The training solution and semantics annotation solution as disclosed in the present disclosure may be used to image search, ad recommendation, vehicle label identification (for traffic management) and other relevant fields; therefore, it has a wide usage.

BRIEF DESCRIPTION OF THE ACCOMPANYING DRAWINGS

Other features, objectives and advantages of the resent invention will become more apparent through reading detailed description of the non-limiting embodiments with reference to the accompanying drawings, wherein same units are represented by same reference numerals.

DETAILED DESCRIPTION OF THE PREFERRED EMBODIMENTS

Hereinafter, the embodiments of the present invention will be introduced in detail with reference to the accompanying drawings.

Figure 1:
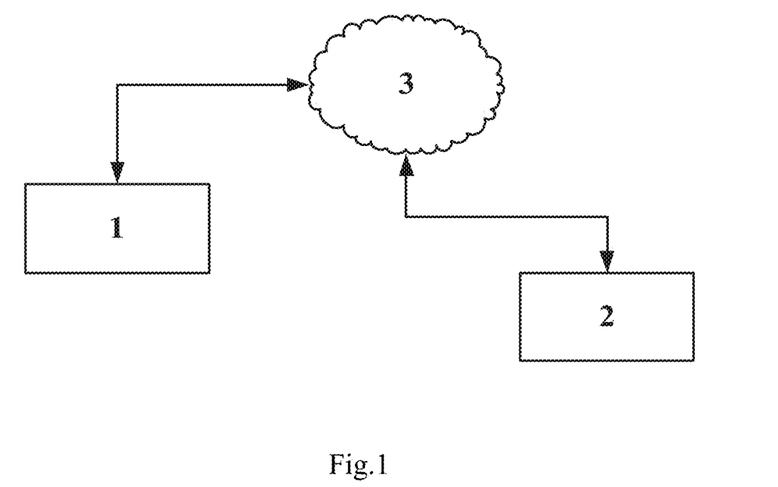
FIG. 1 illustrates a typical application environment of a method, apparatus, and computer device according to an embodiment of the present invention.

First, a typical application environment of the present invention is described. FIG. 1 illustrates two computer devices 1 and 2 and a network 3. The computer devices 1 and 2 are interconnected via the network 3. Moreover, the network 3 is also connected to other network elements or devices not shown in the figure. In this example, the computer device 1 is a server of a search engine operator. The operator maintains image data through the server. These image data are usually annotated with image semantics, so as to be available for a terminal user to access when performing image search via the computer device 2 (e.g., a personal computer or other intelligent device). For example, when the user searches a keyword "Tesla" through the computer device 2, images conforming to this semantics will be displayed on the computer device 2 as a search result.

In order to constantly update the image database, it will be needed to constantly perform semantics annotation to new images without semantics annotation (which therefore may also be referred to as to-be-annotated images) at the computer device 1; then the image semantics annotation apparatus and training and annotating methods will be introduced infra. In some variable examples, the computer device 2 at the user side may also be used to perform semantic annotation to the image; at this point, it is only needed to install/configure the image semantics annotation apparatus (e.g., apparatus 30 illustrated in FIG. 3) in the context for the computer device 2.

Figure 2:
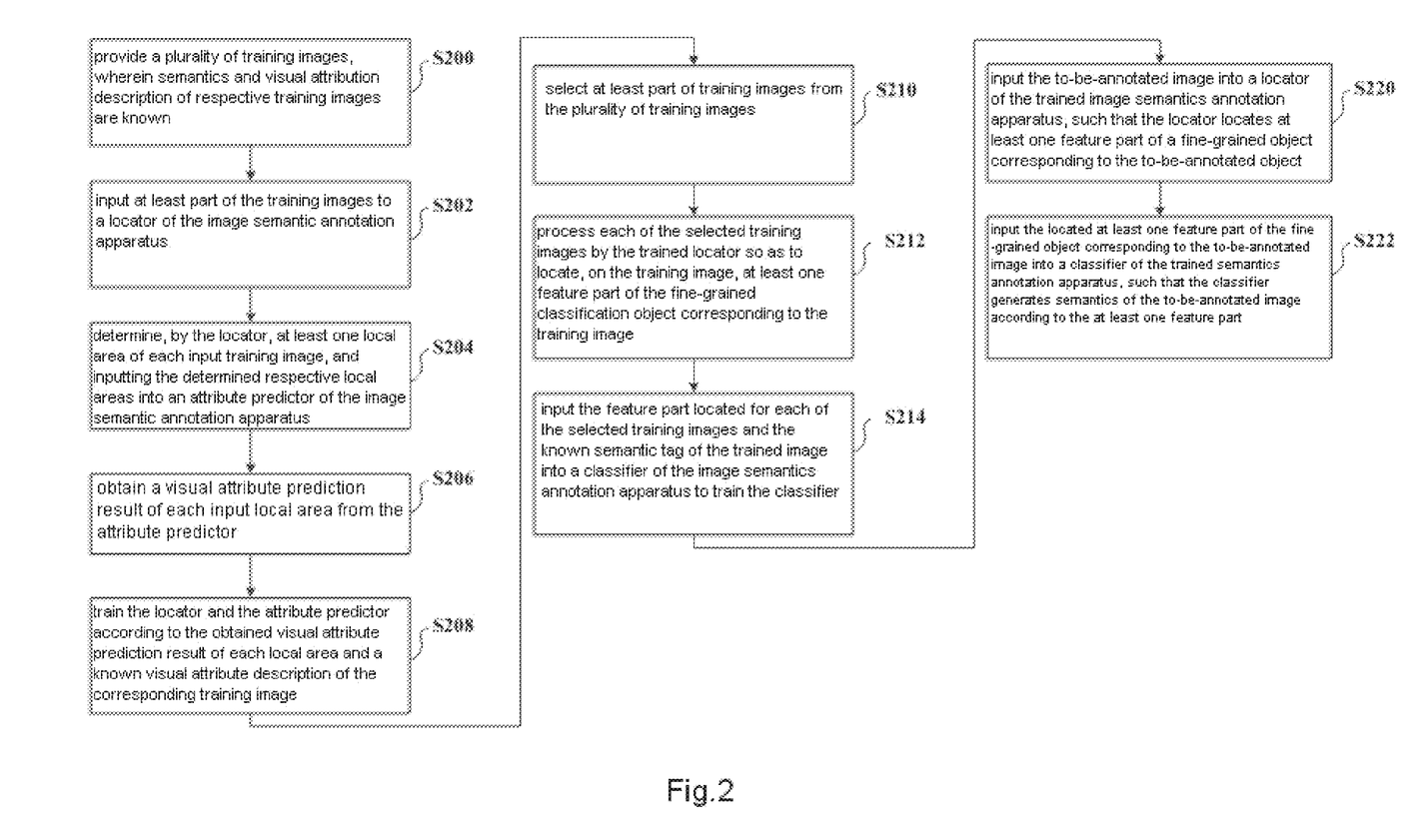
FIG. 2 illustrates a flow diagram of a method for training an image semantics annotation apparatus and performing semantics annotation to a to-be-annotated image according to an embodiment of the present invention.

When an application environment of the present invention is understood, a method for training an image semantics annotation apparatus and performing semantics annotation to a to-be-annotated image according to an embodiment of the present invention will be introduced below, whose flow diagram is illustrated in FIG. 2.

The method is typically executed on a computer device 1 (e.g., a server related to the image database) as illustrated in FIG. 1.

First, in step S200, provide a plurality of training images, wherein semantics and visual attribution description of respective training images are known.

Semantics of the plurality of training images is not completely identical fine-grained semantics corresponding to a same coarse-grained semantics. Generally, the semantics of an image may generally explain to which class of object the image belongs, e.g., "vehicle," "grassland," "cat," and "man." Such broad semantics is referred to as coarse-grained semantics. However, it is needed to further differentiate different fine-grained semantics under a same coarse-grained semantics. For example, the coarse-grained semantics of the images of the two vehicles is "vehicle," while their fine-grained semantics may be "Tesla" for one car, while the other is "Toyota" for the other. The coarse-grained semantics for images of three cats is "cat"; however, the fine-grained semantics for one of them is "Persian Cat," the second one is "Garfield (a cartoon figure)", while the third one is "Tom Cat (a cartoon figure)." The coarse-grained semantics of the images of three birds is "bird." However, the fine-grained semantics of one of them may be "Seagull," the second one is "Parrot," while the third one is "Albatross."

The coarse-grained semantics may correspond to a course-grained classification object, e.g., bird, dog, fish, flower; while different fine-grained semantics may correspond to different fine-grained classification objects corresponding to one coarse-grained classification object. For example, bird, as a coarse-grained classification object, may correspond to a plurality of fine-grained classification objects such as Seagull, Parrot, Albatross, etc.

Wherein each fine-grained classification object may include at least one feature part, e.g., with bird as an example, each fine-grained classification object may include at least one feature part; visual attribute descriptions of respective training images are divided into different groups according to the feature parts corresponding to the visual attribute descriptions. For example, the visual attribute descriptions for birds may be classified into several groups such as head, breast, wing, and tail according to physiological parts of the birds.

The feature parts defining the fine-grained classification objects have special significances to implement the training procedure and semantic annotation in the embodiment. Typically, visual attribute descriptions of feature parts of different fine-grained classification objects for the same coarse-grained classification object may be different, or at least one feature part x exists, where a visual attribute description of the fine-grained classification object A is different from the visual attribute description of the fine-grained classification object B. For example, different fine-grained classification objects "Parrot" and "Seagull" belonging to a same coarse-grained classification object "bird" may differ in the attribute of the feature part "Head," e.g., one being flat, while the other being protruding.

Specifically, the visual attribute or visual attribute description in the context is, for example, red and speckle-patterned wing (corresponding to the feature part wing), brown and flat head (corresponding to the feature part head), white and black, strip-patterned tail (corresponding to the feature part tail), black eye (corresponding to the feature part eye), etc. It is seen that the visual attribute description introduces a local visual appearance of the image. When expressed in mathematics, each attribute may express an answer to a question with "yes" or "no." such questions include, for example, "Is the wing (of the bird) red?" "Is the head (of the bird) flat?" and "Is the tail (of the bird) black?" For each feature part expressed for each training image, an answer to a relevant question should be obtained therefor. Therefore, the visual attribute descriptions of the training image may be expressed as a list represented by binary information "0" or "1" corresponding to the questions.

Correspondingly, the method preferably repeats steps S200-S208 for each feature part that needs to be located so as to train the locator and the attribute predictor till convergence.

According to the embodiment of the present invention, the training pictures provided in step S200 are preferably obtained by digging a webpage through a computer device 1. For example, a webpage for introducing a bird will generally include the following information:

Bird's picture or image;

Specie name of the bird ((fine-grained) semantic label);

Appearance feature of the bird (similar to the visual attribute description above);

Habits and foods of the bird, etc.

Then, by leveraging the textual capture and image capture functions, the image semantics annotation apparatus (not shown) on the computer device 1 may obtain a considerable number of images, as well as semantics labels and visual attribute descriptions of these images, without manual intervention. The semantics labels and visual attribute descriptions of these images are already known when being dug out from the webpage, such that it is unnecessary to manually observe these images to input their semantic labels and/or visual attribute descriptions. In addition, those skilled in the art should understand that visual attribute descriptions, which are not provided for the training images during an existing procedure of obtaining or generating the training images, are one of contributions of the embodiments of the present invention to the field.

Various known or future developed webpage parsing means may be leveraged to obtain the aforesaid training images, semantic labels of the training images, and visual attribute descriptions from webpages or other network resources, including, but not limited to, a solution disclosed in Chinese invention patent publication CN103632388A, which is entirely incorporated into the present application by reference as an illustration to one embodiment of step S200. As an alternative example, the semantics and visual attribute descriptions of the training images in step S200 may be added manually by bare-eye identification. Despite of a high precision assurance, such a practice is rather inefficient. Those skilled in the art may select an appropriate manner depending on the situations.

Figure 4:
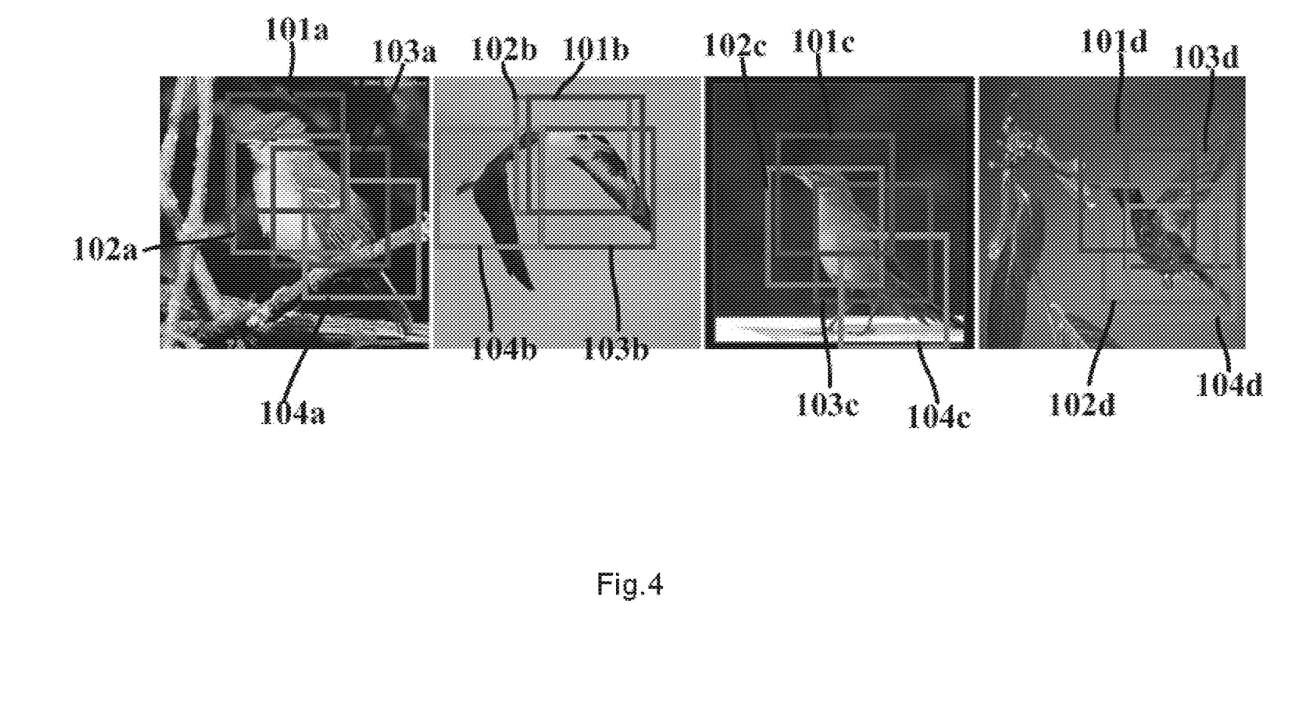
FIG. 4 illustrates an exemplary diagram of a feature part of a fine-grained object corresponding to an image according to an embodiment of the present invention.

Still refer to FIG. 2. After step S200, the method enters into step S202, wherein at least part of the plurality of training images provided in step 200 are input into a locator of the image semantics annotation apparatus for training objects. These training images may be serially input one by one or parallel input, which is not specifically limited here. A main function of the locator here is to locate, on an image, feature parts of fine-grained classification objects corresponding to the image, e.g., after training, on an image of a bird, feature parts like head, breast, wing and tail should be located as accurately as possible (because the appearance features of different species of birds are mainly concentrated on these several parts). A typical example is shown in FIG. 4. In the 4 images from left to right, 101a, 101b, 101c, and 101d respect the feature part heads of four birds, respectively; 102a, 102b, 102c and 102d represent the feature part breast of the four birds, respectively; 103a, 103b, 103c, and 103d represent the feature part wing of the four birds, respectively; while 104a, 104b, 104c, and 104d represent the feature part tail of the four birds, respectively. Please note that although four birds (four different fine-grained classification objects) in this example include four feature parts, the present invention does not require that the fine-grained classification objects expressed in each training image should completely include a same number of feature parts. For example, some training images may only show the head and breast of the birds, while some training images may only show the head of birds, etc. Further, the feature parts that need to be located as mentioned in the context may take a parallel set of the feature parts expressed in these training images.

After the training images are inputted into the locator, the method enters into step S204. In step S204, at least one (e.g., K) local area of the training image is determined by the locator. According to one embodiment, locations of such local areas are obtained by probability distribution sampling of the locator outputs. It may be preset that each local area has an identical and determined size (e.g., determined length and width); then, the locator is only needed to provide a coordinate (x1, y1) of one point (e.g., upper left corner of the local area); then the local area may be determined on the training image. Dependent on different examples, the locator may also determine coordinates of the central point or other specific location of the local area, so as to determine the location and coverage of the local area on the training image. Optionally, the locator may also provide coordinates of four corners for each to-be-determined local area, such that it is unnecessary to define the size of each local area. Those skilled in the art may select, change or expand it as needed. According to one example, a size of the local area above may be set to ¼ or ⅛ of the size of the training image.

After step S204, the method enters step S206, wherein a visual attribute prediction result of each local area as input is obtained by an attribute predictor. The attribute predictor here may be obtained by employing one multi-output classification function through calculation with a neural network or software kit Caffe.

In subsequent step S208, the locator and attribute predictor are trained according to the visual attribute prediction results and known visual attribute descriptions of the corresponding training images provided in step S200. Specifically, for each local area determined by the locator, a loss function is calculated according to a visual attribute prediction result of the local area and a visual attribute description of the corresponding training image, for training the locator and the attribute predictor.

Further, the training comprises: calculating gradients of the locator and the attribute predictor according to a reverse propagation algorithm to determine or update parameters of the locator and the attribute predictor.

As mentioned above, in the method, it is preferable to repeat steps S200-S208 for each feature part that needs to be located till convergence so as to complete training of the locator and the attribute predictor.

Steps 210-214 below relate to training of the classifier, specifically comprising:

In step S210, at least part of training images are selected from the aforesaid plurality of training images having known semantics (e.g., known fine-grained semantics) and known visual attribute description. This selection procedure may be random or may be pointed according to user input rules or system preset rules.

Afterwards, the method enters into step S212, wherein each training image selected out in step S210 is processed by the trained locator so as to locate, on the training image, at least one feature part of the fine-grained classification object corresponding to the training image.

In subsequent step S214, input the feature parts located for each selected training image, and the known semantics of the training image are inputted into the classifier of the image semantics annotation apparatus so as to train the classifier.

Specifically, step S214 may be implemented through the following procedure:

calculating a convolution feature of each located feature part for each selected training image;

generating a vector for each training image according to the calculated convolution feature of each feature part; and training the classifier based on the generated vector by a support vector machine.

Preferably, generating of the vector also consider the overall convolution feature of the training image; specifically, according to this preferred embodiment, step S214 further comprises: for each selected training image, calculating an overall convolution feature of the training image. The calculated overall convolution feature, along with the convolution feature of each feature part of the image, is used for generating the vector for the training image.

At the end of FIG. 2, step S220 and step S222 illustrate a procedure of performing semantic annotation by the image semantics annotation apparatus to a to-be-annotated image after training the locator, attribute predictor and classifier. In step S220, the to-be-annotated image (e.g., the image shown in the lower half part of FIG. 5) is inputted into the trained locator of the image semantics annotation apparatus, such that the locator locates at least one feature part (e.g., head, breast, and the like of the bird) of the fine-grained object corresponding to the to-be-annotated image.

In subsequent step S222, the at least one feature part of the located fine-grained object corresponding to the to-be-annotated image is inputted into the trained classifier of the semantics annotation apparatus, such that the classifier generates semantics of the to-be-annotated image according to at least one feature part. For example, for a bird picture of "albatross," the finally generated semantics may be "albatross."

Now, depiction of training and application of the image semantics annotation apparatus is completed.

Figure 3:
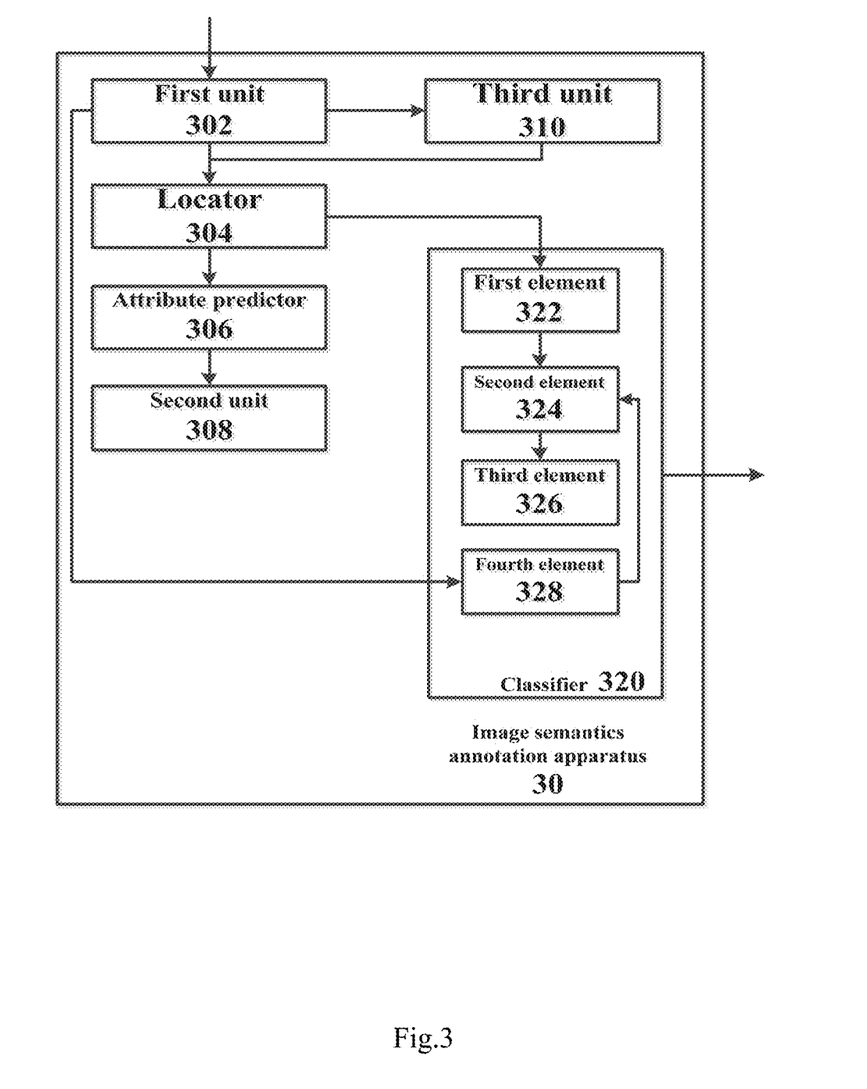
FIG. 3 illustrates a structural block diagram of an image semantics annotation apparatus that can train itself according to an embodiment of the present invention.

FIG. 3 illustrates a structural block diagram of an image semantics annotation apparatus 30 that can train itself according to an embodiment of the present invention. The image semantics annotation apparatus 30 specifically comprises: a first unit 302, a locator 304, an attribute predictor 306, a second unit 308, and a classifier 320, wherein the classifier 320 further comprises a first element 322, a second element 324, a third element 36, and a fourth element 328.

Specifically, the first unit 302 is configured to provide a plurality of training images, wherein semantics and visual attribution description of respective training images are known.

Semantics of the plurality of training images is not completely identical fine-grained semantics corresponding to a same coarse-grained semantics. Generally, the semantics of an image may generally explain to which class of object the image belongs, e.g., "vehicle," "grassland," "cat," and "man." Such broad semantics is referred to as coarse-grained semantics. However, it is needed to further differentiate different fine-grained semantics under a same coarse-grained semantics. For example, the coarse-grained semantics of the images of the two vehicles is "vehicle," while their fine-grained semantics may be "Tesla" for one car, while the other is "Toyota" for the other. The coarse-grained semantics for images of three cats is "cat"; however, the fine-grained semantics for one of them is "Persian Cat," the second one is "Garfield (a cartoon figure)", while the third one is "Tom Cat (a cartoon figure)." The coarse-grained semantics of the images of three birds is "bird." However, the fine-grained semantics of one of them may be "Seagull," the second one is "Parrot," while the third one is "Albatross."

The coarse-grained semantics may correspond to a course-grained classification object, e.g., bird, dog, fish, flower; while different fine-grained semantics may correspond to different fine-grained classification objects corresponding to one coarse-grained classification object. For example, bird, as a coarse-grained classification object, may correspond to a plurality of fine-grained classification objects such as Seagull, Parrot, Albatross, etc.

Wherein each fine-grained classification object may include at least one feature part, e.g., with bird as an example, each fine-grained classification object may include at least one feature part; visual attribute descriptions of respective training images are divided into different groups according to the feature parts corresponding to the visual attribute descriptions. For example, the visual attribute descriptions for birds may be classified into several groups such as head, breast, wing, and tail according to physiological parts of the birds.

The feature parts defining the fine-grained classification objects have special significances to implement the training procedure and semantic annotation in the embodiment. Typically, visual attribute descriptions of feature parts of different fine-grained classification objects for the same coarse-grained classification object may be different, or at least one feature part x exists, where a visual attribute description of the fine-grained classification object A is different from the visual attribute description of the fine-grained classification object B. For example, different fine-grained classification objects "Parrot" and "Seagull" belonging to a same coarse-grained classification object "bird" may differ in the attribute of the feature part "Head," e.g., one being flat, while the other being protruding.

Specifically, the visual attribute or visual attribute description in the context is, for example, red and speckle-patterned wing (corresponding to the feature part wing), brown and flat head (corresponding to the feature part head), white and black, strip-patterned tail (corresponding to the feature part tail), black eye (corresponding to the feature part eye), etc. It is seen that the visual attribute description introduces a local visual appearance of the image. When expressed in mathematics, each attribute may express an answer to a question with "yes" or "no." such questions include, for example, "Is the wing (of the bird) red?" "Is the head (of the bird) flat?" and "Is the tail (of the bird) black?" For each feature part expressed for each training image, an answer to a relevant question should be obtained therefor. Therefore, the visual attribute descriptions of the training image may be expressed as a list represented by binary information "0" or "1" corresponding to the questions.

Correspondingly, the method preferably repeats operations of the first unit 302, locator 304, attribute predictor 306, and second unit 308 for each feature part that needs to be located so as to train the locator 304 and the attribute predictor 306 till convergence.

According to the embodiment of the present invention, the training pictures provided by the first unit 302 are preferably obtained by digging a webpage. For example, a webpage for introducing a bird will generally include the following information:

Bird's picture or image;

Specie name of the bird ((fine-grained) semantic label);

Appearance feature of the bird (similar to the visual attribute description above);

Habits and foods of the bird, etc.

Then, by leveraging the textual capture and image capture functions, the image semantics annotation apparatus (not shown) on the computer device 1 may obtain a considerable number of images, as well as semantics labels and visual attribute descriptions of these images, without manual intervention. The semantics labels and visual attribute descriptions of these images are already known when being dug out from the webpage, such that it is unnecessary to manually observe these images to input their semantic labels and/or visual attribute descriptions. In addition, those skilled in the art should understand that visual attribute descriptions, which are not provided for the training images during an existing procedure of obtaining or generating the training images, are one of contributions of the embodiments of the present invention to the field.

Various known or future developed webpage parsing means may be leveraged to obtain the aforesaid training images, semantic labels of the training images, and visual attribute descriptions from webpages or other network resources, including, but not limited to, a solution disclosed in Chinese invention patent publication CN103632388A, which is entirely incorporated into the present application by reference as an illustration to one embodiment of the first unit 302. As an alternative example, the semantics and visual attribute descriptions of the training images provided by the first unit 302 may be added manually by bare-eye identification. Despite of a high precision assurance, such a practice is rather inefficient. Those skilled in the art may select an appropriate manner depending on the situations.

Still refer to FIG. 3. The training images provided by the first unit 302 are provided to the locator 304, wherein the locator 304 uses at least part of the plurality of training images as inputs. These training images may be serially input one by one or parallel input, which is not specifically limited here. A main function of the locator here is to locate, on an image, feature parts of fine-grained classification objects corresponding to the image, e.g., after training, on an image of a bird, feature parts like head, breast, wing and tail should be located as accurately as possible (because the appearance features of different species of birds are mainly concentrated on these several parts). A typical example is shown in FIG. 4. In the 4 images from left to right, 101*a*, 101*b*, 101*c*, and 101*d* respect the feature part heads of four birds, respectively; 102*a*, 102*b*, 102*c* and 102*d* represent the feature part breast of the four birds, respectively; 103*a*, 103*b*, 103*c*, and 103*d* represent the feature part wing of the four birds, respectively; while 104*a*, 104*b*, 104*c*, and 104*d* represent the feature part tail of the four birds, respectively. Please note that although four birds (four different fine-grained classification objects) in this example include four feature parts, the present invention does not require that the fine-grained classification objects expressed in each training image should completely include a same number of feature parts. For example, some training images may only show the head and breast of the birds, while some training images may only show the head of birds, etc. Further, the feature parts that need to be located as mentioned in the context may take a parallel set of the feature parts expressed in these training images.

After obtaining the inputs, the locator 304 determines at least one (e.g., K) local area of each input training image. According to one embodiment, locations of such local areas are obtained by probability distribution sampling of the locator outputs. It may be preset that each local area has an identical and determined size (e.g., determined length and width); then, the locator is only needed to provide a coordinate (x1, y1) of one point (e.g., upper left corner of the local area); then the local area may be determined on the training image. Dependent on different examples, the locator may also determine coordinates of the central point or other specific location of the local area, so as to determine the location and coverage of the local area on the training image. Optionally, the locator may also provide coordinates of four corners for each to-be-determined local area, such that it is unnecessary to define the size of each local area. Those skilled in the art may select, change or expand it as needed. According to one example, a size of the local area above may be set to ¼ or ⅛ of the size of the training image.

Afterwards, the attribute predictor 306 inputs the determined each local area into a neural network having a multiple-output node to obtain a visual attribute prediction result of the corresponding local area and provides it to the second unit 308.

The second unit 308 trains the locator and attribute predictor according to the visual attribute prediction results and known visual attribute descriptions of the corresponding training images. Specifically, for each local area determined by the locator, a loss function is calculated according to a visual attribute prediction result of the local area and a visual attribute description of the corresponding training image, for training the locator and the attribute predictor.

Further, the training comprises: calculating gradients of the locator and the attribute predictor according to a reverse propagation algorithm to determine or update parameters of the locator and the attribute predictor.

As mentioned above, in the method, it is preferable to repeat the operations of the first unit, locator, attribute predictor, and second unit for each feature part that needs to be located till convergence so as to complete training of the locator 304 and the attribute predictor 306.

Training of the classifier 320 below mainly involves the following procedure:

First, the third unit 310 selects at least part of training images from the aforesaid plurality of training images having known semantics (e.g., known fine-grained semantics) and known visual attribute description. This selection procedure may be random or may be pointed according to user input rules or system preset rules.

Afterwards, the trained locator 304 processes each training image selected out by the third unit 310 so as to locate, on the training image, at least one feature part of the fine-grained classification object corresponding to the training image.

Finally, the feature parts located for each selected training image, and the known semantics of the training image are inputted into the classifier 320 of the image semantics annotation apparatus 30 so as to train the classifier.

Specifically, the classifier 320 comprises the following elements to complete training of itself:

a first element 322 configured to calculate a convolution feature of each located feature part for each selected training image;

a second element 324 configured to generate a vector for each training image according to the calculated convolution feature of each feature part; and a third element 326 configured to train the classifier based on the generated vector by a support vector machine.

Preferably, the second element 324 also considers the overall convolution feature of the training image when generating of the vector; specifically, according to this preferred embodiment, the classifier 320 further comprises a fourth element 328 configured to: for each selected training image, calculate an overall convolution feature of the training image. The calculated overall convolution feature, which is also provided to the second element 324, along with the convolution feature of each feature part of the image, is used for generating the vector for the training image.

Training of the classifier 320 may also be repeated till convergence.

The locator 304 and the classifier 320, after being trained, may be further used to perform semantic annotation to a to-be-annotated image. Specifically, after a to-be-annotated image (e.g., the image illustrated in the lower half part of FIG. 5) is inputted, the image first arrives at the trained locator 304 such that the locator first locates at least one feature part (e.g., head, breast, and the like of the bird) of the fine-grained object corresponding to the to-be-annotated image. Here, the locator 304 may apply, for each feature part, a location model corresponding to the feature part generated in the previous training procedure.

Afterwards, the locator 304 provides a result of locating the feature parts of the to-be-annotated image to the classifier 320, such that the classifier 320 generates semantics of the to-be-annotated image according to at least one feature part located by the locator 304. For example, for a bird picture of "albatross," the finally generated semantics may be "albatross."

Now, depiction of training and application of the image semantics annotation apparatus 30 is completed.

Figure 5:
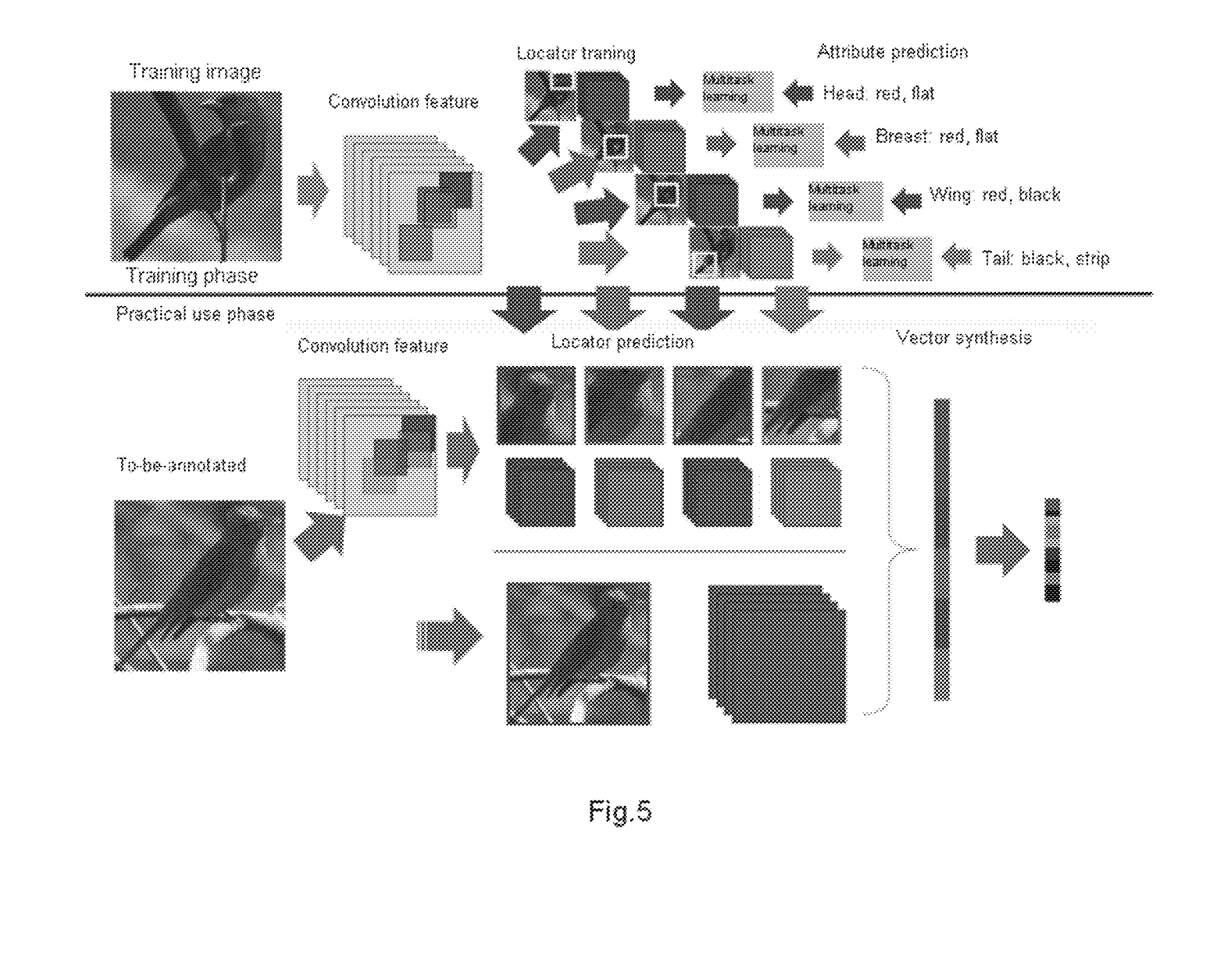
FIG. 5 illustrates a modular diagram for training an image semantics annotation apparatus and for performing semantic annotation to an image according to the embodiments of the present invention.

FIG. 5 illustrates a training and annotation procedure mentioned above from another angle. In short, in the first phase of the training, the locator and the attribute predictor are simultaneously trained. When the visual attribute prediction result obtained by the attribute predictor is consistent with the known visual attribute description of the training image, it may be believed that the local area selected by the locator is an area most suitable for discerning and describing the attributes of the part, i.e., accurately locating the feature part. A plurality of locating models are obtained by training the locator; each location model corresponds to one feature part.

In the second phase of the training, the training classifier obtains a classification model, wherein global map-based image information is extracted for each of respective selected training images, and local information based on each feature part. All of the extracted information is connected into a high-dimension vector to train the classifier, with an intention of causing the fine-grained semantics obtained by the classifier to conform to known semantics of the corresponding training image.

The lower part of FIG. 5 illustrates a trained semantics annotation procedure, comprising: locating a plurality of feature parts on a to-be-annotated image, and ten predicting fine-grained semantics of the to-be-annotated image using the trained classifier.

Although the exemplary embodiments may have various modifications and alternatives, the drawings only illustrate some embodiments thereof in an exemplary manner, which are described in detail here. However, it should be understood that it is not intended to limit the exemplary embodiments to the specific manners as disclosed; on the contrary, the exemplary embodiments intend to cover all modifications, equivalent solutions and alternative solutions falling within the scope of the claims. Same reference numerals always represent same units in depiction of respective drawings.

Before discussing the exemplary embodiments in more detail, it should be noted that some exemplary embodiments are described as processes or methods depicted in flow diagrams. Although the flow diagrams describe various operations into sequential processing, many operations therein may be implemented in parallel, concurrently, or simultaneously. Besides, the sequences of various operations may be re-arranged. When the operations are completed, the processing may be terminated, but there may still have additional steps not included in the accompanying drawings. The processing may correspond to a method, function, specification, sub-routine, sub-program, etc.

The method that will be discussed infra (some of them are illustrated through flow diagrams) may be implemented through hardware, software, firmware, middleware, microcode, hardware description language or any combination thereof. In the case of implementation with software, firmware, middleware or microcode, program codes or code segments for implementing essential tasks may be stored in a machine or computer-readable medium (e.g., storage medium). (One or more) processors may implement essential tasks.

The specific structure and functional details disclosed here are only representative for the purpose of describing the exemplary embodiments of the present invention. However, the present invention may be specifically implemented through many alternative manners and should not be interpreted as being only limited to the embodiments illustrated herein.

It should be understood that although terms "first," "second" and the like may be used here to describe various units, such units should not be limited by these terms. Use of these terms is only for distinguishing one unit from another unit. For example, without departing from the scope of the exemplary embodiments, the first unit may be referred to as the second unit, and similarly, the second unit may be referred to as the first unit. The term "and/or" used here includes any and all combinations of one or more associated items as limited.

The terms used here are only for describing preferred embodiments, not intended to limit the exemplary embodiments. Unless otherwise explicitly indicated in the context, the singular forms "a" and "one" as used here also intend to include plurality. It should also be understood that the terms "comprise" and/or "include" used here prescribe existence of the stated feature, integer, step, operation, unit and/or component, without excluding existence or addition of one or more other features, integers, steps, operations, units, components and/or combinations thereof.

It should also be noted that in some alternative embodiments, the mentioned functions/actions may occur in a sequence different from what is marked in the drawings. For example, dependent on the involved functions/actions, two successively illustrated drawings may be executed substantially simultaneously or sometimes in a reverse order.

Unless otherwise defined, all terms (including technical and scientific terms) used herein have the same meanings as generally understood by those skilled in the art within the field of the exemplary embodiments. It should also be understood that unless explicitly defined here, those terms defined in a typical dictionary should be interpreted to have a meaning consistent with that in a context of a relevant field, and should not be interpreted according to an ideal or over formal meaning.

Some parts of the exemplary embodiments and corresponding detailed depiction are provided through software or algorithm within a computer memory or through symbols for operating data bits. Such depictions and expressions are depictions and expressions used by those skilled in the art to effective convey their work essence to other skilled in the art. Like what are generally used, the term "algorithm" used here is envisaged to a sequence of steps for achieving a desired result. The steps are those steps that need to physically manipulate the physical amounts. Generally but not essentially, these numbers adopt forms of optical, electric or magnetic signals that can be stored, transported, combined, compared and manipulated by other manners. Mainly for the reasons of usual use, it has been proved that these signals are sometimes referred to as bits, numerical values, elements, symbols, characters, items, and digits, etc.

In the depiction below, illustrate embodiments may be depicted with actions implemented as function modules or function processing and symbol expressions of operations (e.g., in the form of flow diagrams). The program module or function processing comprises a routine, program, object, assembly and data structure and the like that implements a specific task or implements a specific abstract data type, and may be implemented using existing hardware at the existing network unit. Such existing hardware may comprise one or more central processing units (CPUs), a digital signal processor (DSP), an application-specific integrated circuit, and a field programmable gate array (FPGA) computer, etc.

However, it should be noted that all of these and similar terms should be associated with appropriate physical quantities and are only convenient labels applied to these quantities. Unless explicitly stated otherwise or clearly seen from the discussion, terms like "processing," "computing," "determining" or "displaying" refer to actions and processing of a computer system or a similar electronic computing device, which manipulate data expressed as physical and electronic quantities within the register and memory of the computer system and transform them into other data similarly expressed as the physical quantities within the computer system memory or register or other such kind of information storage, transmission or display devices.

It should also be noted that the software-implemented aspects of the exemplary embodiments are usually encoded on a certain form of program storage medium or implemented by a certain kind of transmission medium. The program storage medium may be magnetic (e.g., floppy disk or hard disk driver) or optical (e.g., compact disk read-only storage memory or "CD-ROM"), and may be read-only or random access storage medium. Similarly, the transmission medium may be twisted pair, co-axial cable, optical fiber or some other appropriate transmission medium known in the art. The exemplary embodiments are not limited to any of these aspects with given embodiments.

The processor and memory may operate together to run functions of the apparatus. For example, the memory may store code segments about the apparatus functions. The code segments may also be executed by the processor. Besides, the memory may store processing variables and constants for the processor to use.

It should be noted that the present disclosure may be implemented in software or a combination of software and hardware; for example, it may be implemented by a dedicated integrated circuit (ASIC), a general-purpose computer, or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Certain embodiments of the present invention can also be specified as the following clauses:

1. A method of training an image semantic annotation apparatus, comprising:
   a. providing a plurality of training images, wherein semantics and visual attribution description of respective training images are known;
   b. inputting at least part of the training images to a locator of the image semantic annotation apparatus;
   c. determining, by the locator, at least one local area of each input training image, and inputting the determined respective local areas into an attribute predictor of the image semantic annotation apparatus;
   d. obtaining a visual attribute prediction result of each input local area from the attribute predictor;
   e. training the locator and the attribute predictor according to the obtained visual attribute prediction result of each local area and a known visual attribute description of the corresponding training image.

2. The method according to clause 1, wherein:
   semantics of the plurality of training images is not completely identical fine-grained semantics corresponding to a same coarse-grained semantics.

3. The method according to clause 2, wherein:
   the coarse-grained semantics corresponds to a coarse-grained classification object; the different fine-grained semantics corresponds to different fine-grained classification objects belonging to the coarse-grained classification object.

4. The method according to clause 3, wherein:
   each of the fine-grained classification objects includes at least one feature part, the visual attribute descriptions are divided into different groups based on their corresponding feature parts, the method comprising:
   for each of the feature parts, repeating steps a to d till convergence.

5. The method according to any one of clauses 1-4, wherein: the step a comprises:
   digging a page including images to obtain a plurality of training images, the semantic tags and the visual attribute descriptions of respective training images.

6. The method according to any one of clauses 1-5, wherein the step e comprises:
   for each of the local areas, calculating a loss function according to a visual attribute prediction result of the local area and a visual attribute description of the corresponding training image, for training the locator and the attribute predictor.

7. The method according to clause 6, wherein the step e further comprises:

calculating gradients of the locator and the attribute predictor according to a reverse propagation algorithm to determine or update parameters of the locator and the attribute predictor.

8. The method according to clause 4, wherein the method further comprises:

f. selecting at least part of training images from the plurality of training images;

g. processing each of the selected training images by the trained locator so as to locate, on the training image, at least one feature part of the fine-grained classification object corresponding to the training image;

h. inputting the feature part located for each of the selected training images and the known semantic tag of the trained image into a classifier of the image semantics annotation apparatus to train the classifier.

9. The method according to clause 8, wherein the step h comprises:

calculating a convolution feature of each located feature part for each of the selected training images;

generating a vector for the training image according to the calculated convolution feature of each feature part; and training the classifier by a support vector machine according to the generated vector.

10. The method according to clause 9, wherein the step h further comprises:

for each selected training image, calculating an overall convolution feature of the training image;

the step of generating a vector for the image further comprises:

generating the vector for the training image according to the calculated overall convolution feature of the image and the calculated convolution feature of each feature part of the image.

11. An image semantics annotation method, comprising:

I. training the image semantics annotation apparatus according to a method of any one of clauses 1 to 10;

II. performing semantics annotation to the trained image semantics annotation apparatus.

12. The method according to clause 11, wherein the step II comprises:

inputting the to-be-annotated image into a locator of the trained image semantics annotation apparatus, such that the locator locates at least one feature part of a fine-grained object corresponding to the to-be-annotated object;

inputting the located at least one feature part of the fine-grained object corresponding to the to-be-annotated image into a classifier of the trained semantics annotation apparatus, such that the classifier generates semantics of the to-be-annotated image according to the at least one feature part.

13. The method according to clause 12, wherein the semantics generated by the classifier for the to-be-annotated image includes fine-grained semantics.

14. An image semantics annotating apparatus that can train itself, comprising:

a first unit configured to provide a plurality of training images, wherein semantics and visual attribution description of respective training images are known;

a locator configured to determine, using at least part of the plurality of training images as input, at least one local area of each input training image;

an attribute predictor configured to obtain, with the each local area determined by the locator, a visual attribute prediction result of each input local area; and a second unit configured to train the locator and the attribute predictor according to the obtained visual attribute prediction result of each local area and a known visual attribute description of the corresponding training image.

15. The image semantics annotating apparatus according to clause 14, wherein:

semantics of the plurality of training images is not completely identical fine-grained semantics corresponding to a same course-grained semantics.

16. The image semantics annotating apparatus according to clause 15, wherein:

the coarse-grained semantics corresponds to a coarse-grained classification object; and the different fine-grained semantics corresponds to different fine-grained classification objects belonging to the coarse-grained classification object.

17. The image semantics annotating apparatus according to clause 16, wherein:

each of the fine-grained classification objects includes at least one feature part, the visual attribute descriptions are divided into different groups based on their corresponding feature parts; the first unit, the locator, the attribute predictor and the second unit are also configured to:

for each of the feature parts, perform their own operations till convergence.

18. The image semantics annotating apparatus according to any one of clauses 14-17, wherein the first unit is further configured to:

dig a page including images to obtain a plurality of training images, the semantic tags and the visual attribute descriptions of respective training images.

19. The image semantics annotating apparatus according to any one of clauses 14-18, wherein the second unit is further configured to:

for each of the local areas, calculate a loss function according to a visual attribute prediction result of the local area and a visual attribute description of the corresponding training image, for training the locator and the attribute predictor.

20. The image semantics annotating apparatus according to clause 19, wherein the second unit is further configured to:

calculate gradients of the locator and the attribute predictor according to a reverse propagation algorithm to determine or update parameters of the locator and the attribute predictor.

21. The image semantics annotating apparatus according to clause 17, further comprising:

a third unit configured to select at least part of training images from the plurality of training images; the locator is further configured to:

after the training above, process each of the training images selected by the third unit so as to locate, on the training image, at least one feature part of the fine-grained classification object corresponding to the training image;

the image semantics annotation apparatus further comprises:

a classifier configured to train the classifier per se with each feature part located by the locator on each selected training image and the known the known semantic tag of each selected training image as inputs.

22. The image semantics annotating apparatus according to clause 21, wherein the classifier comprises:

a first element configured to calculate a convolution feature of each located feature part for each of the selected training images;

a second element configured to generate a vector for the training image according to the calculated convolution feature of each feature part; and a third element configured to train the classifier by a support vector machine according to the generated vector.

23. The image semantics annotating apparatus according to clause 22, wherein the classifier further comprises:

a fourth element configured to calculate an overall convolution feature of each training image selected by the third element;

the second element is further configured to: for each training image selected by the third unit, generate the vector for the training image according to the calculated convolution feature of respective feature parts of the training image as calculated by the first element and the overall convolution feature of the training image calculated by the fourth element.

24. The image semantics annotating apparatus according to any one of clauses 14-23, wherein:

the locator is further configured to, after the training above, locate, on a to-be-annotated image, at least one feature part of the fine-grained object corresponding to the to-be-annotated image; and the classifier is further configured to generate semantics of the to-be-annotated image with the at least one feature part located by the locator on the to-be-annotated image as input.

25. The image semantics annotating apparatus according to clause 24, wherein the semantics of the to-be-annotated image, as generated by the classifier, includes fine-grained semantics.

26. A computer device, comprising an image semantics annotation apparatus that can train itself according to any one of clauses 14-25.

The invention claimed is:

1. A method of training an image semantic annotation apparatus, comprising:

a. providing a plurality of training images, wherein semantics and visual attribution description of respective training images are known, by automatically parsing, through a computer device, webpages including images to obtain therefrom the plurality of training images, the known semantics, and the known visual attribute descriptions of respective ones of the training images, the known semantics include coarse-grained semantics and fine-grained semantics that are not completely identical to the corresponding coarse-grained semantics for a respective one of the plurality of training images, wherein the coarse-grained semantics corresponds to a coarse-grained classification object, and the different fine-grained semantics corresponds to different fine-grained classification objects belonging to the same coarse-grained classification object, each of the fine-grained classification objects including a plurality of feature parts, the visual attribute descriptions being divided into different groups based on their corresponding feature parts, each of the visual attribute descriptions expressing a local visual appearance of corresponding ones of the feature parts, wherein the webpages include textual data relating to the images, and wherein the known semantics and known visual attribute descriptions result from capturing the textual data;

b. inputting the training images each including a given fine-grained classification object to a locator of the image semantic annotation apparatus, wherein the locator is configured to determine a coordinate on the training image, determine a local area on the training image based on the coordinate, and determine a part of the fine-grained classification object within the local area as the feature part;

c. determining, by the locator, a plurality of local areas of each input training image, wherein a location of the at least one local area on the input training image is determined by probability distribution sampling of the locator outputs of the plurality of feature parts, wherein each of the determined local areas of each input training image comprises one feature part of the given fine-grained classification object included in the each input training image, and the different determined local areas in the each input training image comprise different features parts of the given fine-grained classification object, and inputting the determined respective local areas into an attribute predictor of the image semantic annotation apparatus, the plurality of local areas including a coordinate on the input training image and having a size less than a size of the input training image;

d. obtaining a visual attribute prediction result of each input local area from the attribute predictor, wherein the visual attribute prediction result of each input local area comprises a visual attribute description of the feature part located in the each input local area;

e. training the locator and the attribute predictor according to the obtained visual attribute prediction result of each local area and a known visual attribute description of the corresponding training image, and for each of the feature parts to be located on the corresponding training image, repeating steps a to e until convergence to complete training of the locator and of the attribute predictor, wherein the known visual attribute description of the corresponding training image comprises known visual attribute descriptions of the feature parts of the given fine-grained classification object in the corresponding training image;

f. selecting at least part of training images from the plurality of training images;

g. by the trained locator, locating, on the training image, the plurality of feature parts of the given fine-grained classification object corresponding to each of the selected training images by processing each of the selected training images, wherein the locating comprises determining the coordinate on the each training image, and determining the feature part of the given fine-grained classification object based on the coordinate on the each training image;

h. inputting the feature parts located for the given fine-grained classification object of each of the selected training images and the known fine-grained semantic of the given fine-grained classification object in the each training image into a classifier of the image semantics annotation apparatus to train the classifier.

2. The method according to claim 1, wherein the step e comprises: for each of the local areas, calculating a loss function according to the visual attribute prediction result of the local area and the visual attribute description of the corresponding training image, for training the locator and the attribute predictor.

3. The method according to claim 2, wherein the step e further comprises: calculating gradients of the locator and the attribute predictor according to a reverse propagation algorithm to determine or update parameters of the locator and the attribute predictor.

4. The method according to claim 1, wherein the step h comprises: calculating a convolution feature of each located feature part for each of the selected training images; generating a vector for the training image according to the calculated convolution feature of each feature part; and training the classifier by a support vector machine according to the generated vector.

5. The method according to claim 4, wherein the step h further comprises: for each selected training image, calculating an overall convolution feature of the training image; the step of generating a vector for the image further comprises: generating the vector for the training image according to the calculated overall convolution feature of the image and the calculated convolution feature of each feature part of the image.

6. The method according to claim 1, wherein a size of each local area is preset, and the locator is configured determine the local area on the training image based on the coordinate and the size of the local area.

7. The method according to claim 1, wherein the locator is configured to determine a plurality of coordinates on the training image, and determine the local area by using positions of the plurality of coordinates as corners of the local area.

8. The method according to claim 1, wherein the locator is configured to determine a plurality of coordinates on the training image, and determine the local area by using a position of one of the coordinates as a center point of the local area, and using positions of the other coordinates as a boundary.

9. A computer device that can train itself, comprising: a processor and a memory, the processor being configured to:
provide a plurality of training images, wherein semantics and visual attribution description of respective training images are known, by automatically parsing, through the computer device that can train itself, webpages including images to obtain therefrom the plurality of training images, the known semantics, and the known visual attribute descriptions of respective ones of the training images, the known semantics include coarse-grained semantics and fine-grained semantics that are not completely identical to the corresponding coarse-grained semantics for a respective one of the plurality of training images, wherein the coarse-grained semantics corresponds to a coarse-grained classification object, and the different fine-grained semantics corresponds to different fine-grained classification objects belonging to the same coarse-grained classification object, each of the fine-grained classification objects including a plurality of feature parts, the visual attribute descriptions being divided into different groups based on their corresponding feature parts, each of the visual attribute descriptions expressing a local visual appearance of corresponding ones of the feature parts, wherein the webpages include textual data relating to the images, and wherein the known semantics and known visual attribute descriptions result from capturing the textual data;
input the training images each including a given fine-grained classification object to a locator, wherein the locator is configured to determine a coordinate on the training image, determine a local area on the training image based on the coordinate, and determine a part of the fine-grained classification object within the local area as the feature part;
determine, by the locator, a plurality of local areas of each input training image, wherein a location of the at least one local area on the input training image is determined by probability distribution sampling of the locator outputs of the plurality of feature parts, wherein each of the determined local areas of each input training image comprises one feature part of the given fine-grained classification object, and the different determined local areas in the each input training image comprise different features parts of the given fine-grained classification object, the plurality of local areas including a coordinate on the input training image and having a size less than a size of the input training image;
obtain, with the each local area determined, a visual attribute prediction result of each input local area, wherein the visual attribute prediction result of each input local area comprises a visual attribute description of the feature part located in the each input local area;
train the computer device according to the obtained visual attribute prediction result of each local area and a known visual attribute description of the corresponding training image, and for each of the feature parts to be located on the corresponding training image, perform the aforementioned operations until convergence to complete training of the computer device, wherein the known visual attribute description of the corresponding training image comprises known visual attribute descriptions of the feature parts of the given fine-grained classification object in the corresponding training image;
select at least part of training images from the plurality of training images;
locate, on the training image, the plurality of feature parts of the given fine-grained classification object corresponding to each of the selected training images by processing each of the selected training images, wherein the locating comprises determining the coordinate on the each training image, and determining the feature part of the given fine-grained classification object based on the coordinate on the each training image; and
input the feature parts located for the given fine-grained classification object of each of the selected training images and the known fine-grained semantic of the given fine-grained classification object in the each training image into a classifier to train the computer device.

10. The computer device according to claim 9, wherein the processor is further configured to: for each of the local areas, calculate a loss function according to the visual attribute prediction result of the local area and the visual attribute description of the corresponding training image, for training the computer device.

11. The computer device according to claim 10, wherein the processor is further configured to: calculate gradients according to a reverse propagation algorithm to determine or update corresponding parameters.

12. A non-transitory computer readable non-volatile memory storing computer program, the computer program configured to, when executed by a computer device, make the computer device to perform a method comprising the following steps:
a. providing a plurality of training images, wherein semantics and visual attribution description of respective training images are known, by automatically parsing, through a computer device, webpages including images to obtain therefrom the plurality of training images, the known semantics, and the known visual attribute descriptions of respective ones of the training images, the known semantics include coarse-grained semantics and fine-grained semantics that are not completely identical to the corresponding coarse-grained semantics for a respective one of the plurality of training images, wherein the coarse-grained semantics corresponds to a coarse-grained classification object, and the different fine-grained semantics corresponds to different fine-grained classification objects belonging to the same coarse-grained classification object, each of the fine-grained classification objects including a plurality of feature parts, the visual attribute descriptions being divided into different groups based on their corresponding feature parts, each of the visual attribute descriptions expressing a local visual appearance of corresponding ones of the feature parts, wherein the webpages include textual data relating to the images, and wherein the known semantics and known visual attribute descriptions result from capturing the textual data;

b. inputting the training images each including a given fine-grained classification object to a locator of the image semantic annotation apparatus, wherein the locator is configured to determine a coordinate on the training image, determine a local area on the training image based on the coordinate, and determine a part of the fine-grained classification object within the local area as the feature part;

c. determining, by the locator, a plurality of local areas of each input training image, wherein a location of the at least one local area on the input training image is determined by probability distribution sampling of the locator outputs of the plurality of feature parts, wherein each of the determined local areas of each input training image comprises one feature part of the given fine-grained classification object included in the each input training image, and the different determined local areas in the each input training image comprise different features parts of the given fine-grained classification object, and inputting the determined respective local areas into an attribute predictor of the image semantic annotation apparatus, the plurality of local areas including a coordinate on the input training image and having a size less than a size of the input training image;

d. obtaining a visual attribute prediction result of each input local area from the attribute predictor, wherein the visual attribute prediction result of each input local area comprises a visual attribute description of the feature part located in the each input local area;

e. training the locator and the attribute predictor according to the obtained visual attribute prediction result of each local area and a known visual attribute description of the corresponding training image, and for each of the feature parts to be located on the corresponding training image, repeating steps a to e until convergence to complete training of the locator and of the attribute predictor, wherein the known visual attribute description of the corresponding training image comprises known visual attribute descriptions of the feature parts of the given fine-grained classification object in the corresponding training image;

f. selecting at least part of training images from the plurality of training images;

g. via the trained locator, locating, on the training image, the plurality of feature parts of the given fine-grained classification object corresponding to each of the selected training images by processing each of the selected training images, wherein the locating comprises determining the coordinate on the each training image, and determining the feature part of the given fine-grained classification object based on the coordinate on the each training image;

h. inputting the feature parts located for the given fine-grained classification object of each of the selected training images and the known fine-grained semantic of the fine-grained classification object in the training image into a classifier of the image semantics annotation apparatus to train the classifier.

* * * * *